United States Patent [19]

Braun et al.

[11] 3,725,598

[45] Apr. 3, 1973

[54] DIGITAL REGISTER READOUT CIRCUIT

[75] Inventors: Edwin Julius Braun; Henry August Meise, Jr.; George William Taylor, all of Boulder, Colo.

[73] Assignee: Bell Telephone Laboratories Incorporated, Murray Hill, N.J.

[22] Filed: July 16, 1971

[21] Appl. No.: 163,213

[52] U.S. Cl. ....179/18 EB
[51] Int. Cl. ....H04q 3/42
[58] Field of Search ....179/18 EB, 7 R

[56] References Cited

UNITED STATES PATENTS

| | | | |
|---|---|---|---|
| 3,278,691 | 10/1966 | Sherstiuk | 179/18 EB |
| 3,366,778 | 1/1968 | Stefano | 179/18 EB X |

*Primary Examiner*—Thomas W. Brown
*Attorney*—R. J. Guenther et al.

[57] ABSTRACT

A register readout circuit arranged for use with common control switching systems wherein number digits are stored and serially read out at a high speed into a common controller. The circuitry utilizes binary ripple counters having a predetermined number of counting states to register each number digit. During the readout sequence, the common controller applies a high speed pulse train having a number of pulses equal to the number of counting states to each counter. When the counters are advanced to their initial zero counting states associated logic circuitry is enabled to gate remaining pulses of the high speed pulse train over digital leads to the common controller. Since the remaining pulses are mathematically equal to the registered number digits of the counters their reception by the common controller effectively constitutes a nondestructive readout of the registered number digit.

11 Claims, 4 Drawing Figures

INVENTORS E.J. BRAUN
H.A. MEISE, JR.
G.W. TAYLOR
BY Charles H. Davis
ATTORNEY

DIGITAL REGISTER READOUT CIRCUIT

BACKGROUND OF THE INVENTION

1. Field of the Invention

This invention concerns switching systems. In particular it relates to a common control switching system wherein signals representing directory numbers priorly generated by connecting stations are first stored and then serially transmitted from a register to common control to direct operation of the switching system.

2. Description of the Prior Art

The control of switching systems by subscriber generated directory numbers requires that pulse registration equipment be attached to calling circuits to count and store pulses representing successively received digits of the directory numbers. Each received digit must in turn be read out of the pulse registration equipment into common control equipment in order that a connection may be established from the calling subscriber through the switching system to the called subscriber.

A typical switching system such as the one disclosed by H. H. Abbott et al. in U.S. Pat. No. 3,377,432, issued Apr. 9, 1968, basically comprises line circuits, a switch network, trunk circuits, a common control circuit and pulse registration equipment, hereinafter, referred to as registers. In the normal operation of this type of prior art switching system the registers are employed to receive, count, and store pulses representing directory number digits generated by subscriber entities utilizing the switching system line and trunk circuits.

As is the practice in many switching systems, such as the telephone switching system set forth by R. C. Gebhardt et al. in U. S. Pat. No. 3,225,144, issued Dec. 21, 1965, the initial digit, or various number digit combinations, are utilized to direct the operation of the switching system. Thus, a first stored digit might define the general destination of a desired connection to an attendant, another switching system, or to a station served by the general telephone switching network. A second stored digit in combination with a stored first digit may define a connection to a specific switching system while a third stored digit in combination with two previously stored digits may define a connection to an attendant of the specific switching system. Depending upon the size of the switching system, four stored digits may fully specify that a connection is to be established between stations of a single switching system.

Once the register has stored the pulses of the first received number digit a decision must be made to receive subsequently generated number digit pulses or to transfer the stored first digit to the common control circuit in order that the desired connection may be established through the switching network. The prior art registers set forth by the aforementioned Abbott patent are arranged to detect the storage of a predetermined first digit, for example "0" or "9", and upon receipt of these digits, to immediately transfer the stored digit to the common control circuit. In the event a digit other than a predetermined first digit is detected the register continues to store subsequently generated digit pulses. The registers disclosed in the Gebhard et al. patent, and referred to therein as signaling receivers, are arranged so that upon receipt and storage of predetermined orders of number digit combinations all previously stored digits are transmitted to the common control circuit for translation and call processing.

The prior art registers comprise a plurality of plural order counters wherein every counter includes logic storage elements interconnected so as to count and store the pulses of each received digit. Readout of an individual counter is accomplished by utilizing a plurality of logic gates having a common enabling lead and each having an input connected to a corresponding one of the counter storage elements. Upon detection of a valid first digit, the register requests readout by transmitting a signal to the common control circuit. The common control circuit scans all system registers and upon selecting the requesting register, initiates a register readout sequence by enabling the plurality of logic gates to read the contents of all counter storage elements over parallel leads into the common control circuit. In the event the first digit dictates that more number digits are required, the common control circuit releases the register to count and store additional digits. When subsequent number digits have been stored, the common control circuit again selects the register and reads the contents of every logic storage element of all digital counters over a multiplicity of parallel leads extending from the register to the common control circuit.

Although the registers disclosed by the previously recited Abbott and Gebhardt patents are a substantial contribution to the technology, it must be recognized that each of these prior art registers requires that a multitude of parallel leads be extended from each digit counter to the common control circuit. It must also be recognized that a number of parallel leads are required in order that number digital information may rapidly be read from the register during the short time interval existing between two successively received number digits and that the total number of leads must necessarily be increased as more number digits are transmitted from a register to the common control circuit.

Accordingly, a need exists in the art for a digital register readout circuit capable of transferrring previously stored number digits over single leads extending from the register to the common control circuit of a switching system. A need also exists for a circuit arrangement whereby the above transfer of previously received number digits may be accomplished in a small time interval existing between successively received number digits.

SUMMARY OF THE INVENTION

In accordance with one exemplary embodiment of our invention, pulses representing digits are counted and stored in a plurality of digit counters, there being one counter provided for each digit to be registered. The pulses of each digit are counted and stored in the appropriate digit counter in one of a fixed number of counting states.

After each digit has been counted and stored, all stored digits are simultaneously and nondestructively read out of the digit counters and transferred at high speed over single digital leads extending from the digit counters to control circuitry during the interdigital interval.

Specifically, in accordance with this embodiment of our invention, a high speed pulse train having a number of pulses equal to the fixed number of counting states is applied to all digit counters to rapidly advance the counters from a stored digit counting state through an initial counting state back to the stored digit counting state.

In accordance with an aspect of our invention, we provide circuitry for detecting the progression of each digit counter through the initial counting state and for gating a number of high speed pulses corresponding to the remaining number of fixed counting states onto a single lead extending from that counter to the control circuit. Thus, if a 16 state digit counter has stored the digit "4", the first 12 high speed pulses applied to the digit counter would cause it to count to its initial or "0" counting state and the remaining four high speed pulses would be gated to the control circuit. Accordingly, the control circuit has received the digit "4" and the digit counter is returned to the same prior stored digit counting state representing the digit "4".

Advantageously our invention may be utilized to allow recognition by the control circuit of a variable number of digit combinations since all priorly stored digits can be read out of their respective digit counters after each digit is received. This arrangement has particular utility in switching systems wherein different combinations of digits may be used for special purposes.

It is as aspect of our invention that a stored digit is rapidly gated onto a single lead extending from a cyclic counter during an interdigtal time interval.

It is another aspect of our invention that each cyclic register counter comprises a plurality of circuit elements, such as flip-flops, arranged to have a plurality of counting states and that the stored digit is transferred nondestructively onto a single lead by applying high speed pulses to the cyclic counter to cause it to count through all of its possible states.

It is a still further aspect of our invention that the occurrence of the initial state is detected and causes the gating of the remainder of the high speed pulses onto the single lead.

DESCRIPTION OF THE DRAWING

The foregoing objects and advantages, as well as others of the invention, will be more apparent from a description of the drawing, in which.

Figure 2:
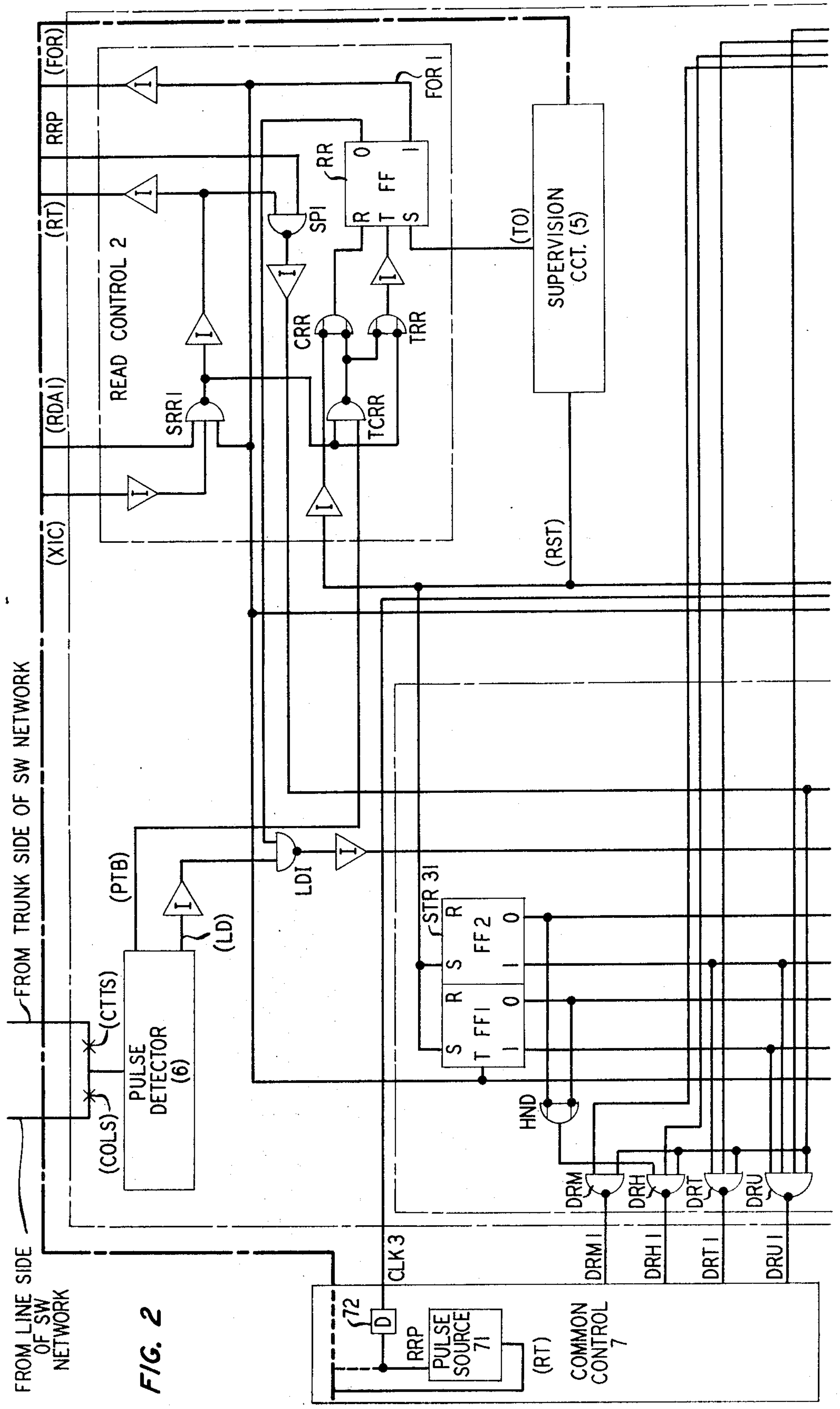
FIGS. 2 and 3, when arranged in accordance with FIG. 4, set forth the circuit details of a switching system register in accordance with an illustrative embodiment of the present invention.
Figures 3, 4:
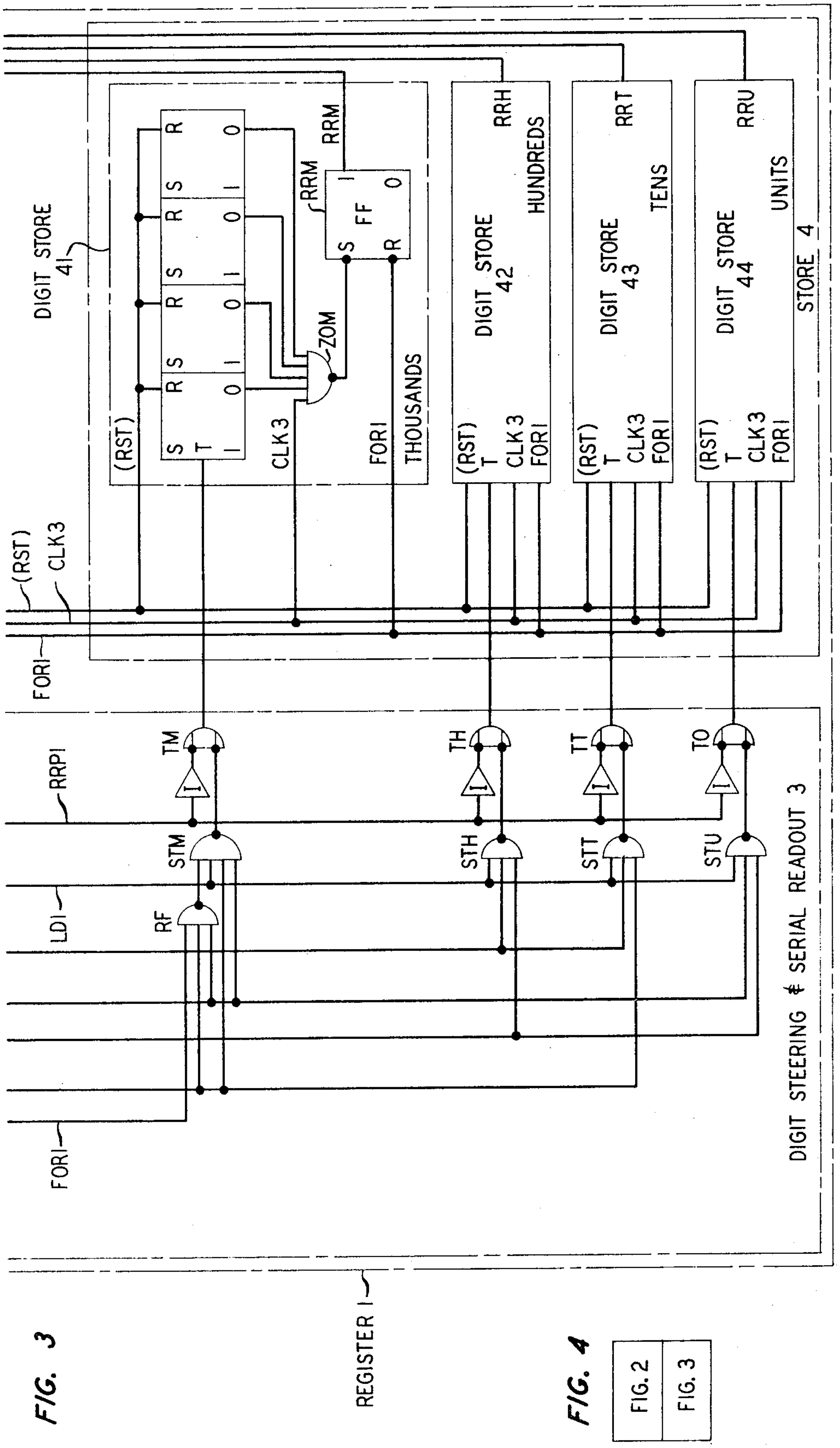

The detailed logic of the register shown in FIGS. 2 and 3 is performed by combinations of logic gates, inverters, and flip-flops, the operation and schematic representation of which are well known in the art and are described by J. Millman and H. Taub in the textbook *Pulse, Digital, and Switching Waveforms*, 1965, McGraw-Hill, Inc. Where logic symbols are involved, a circle on an input is an indication that a low signal is required to activate the circuit. The absence of a circle is used to indicate that a high signal is required to activate the circuit. The resulting polarity of a circuit output may be determined in the same manner. For example, a high signal on both inputs of AND gate DRM of FIG. 2 results in a low signal output.

GENERAL DESCRIPTION

Figure 1:
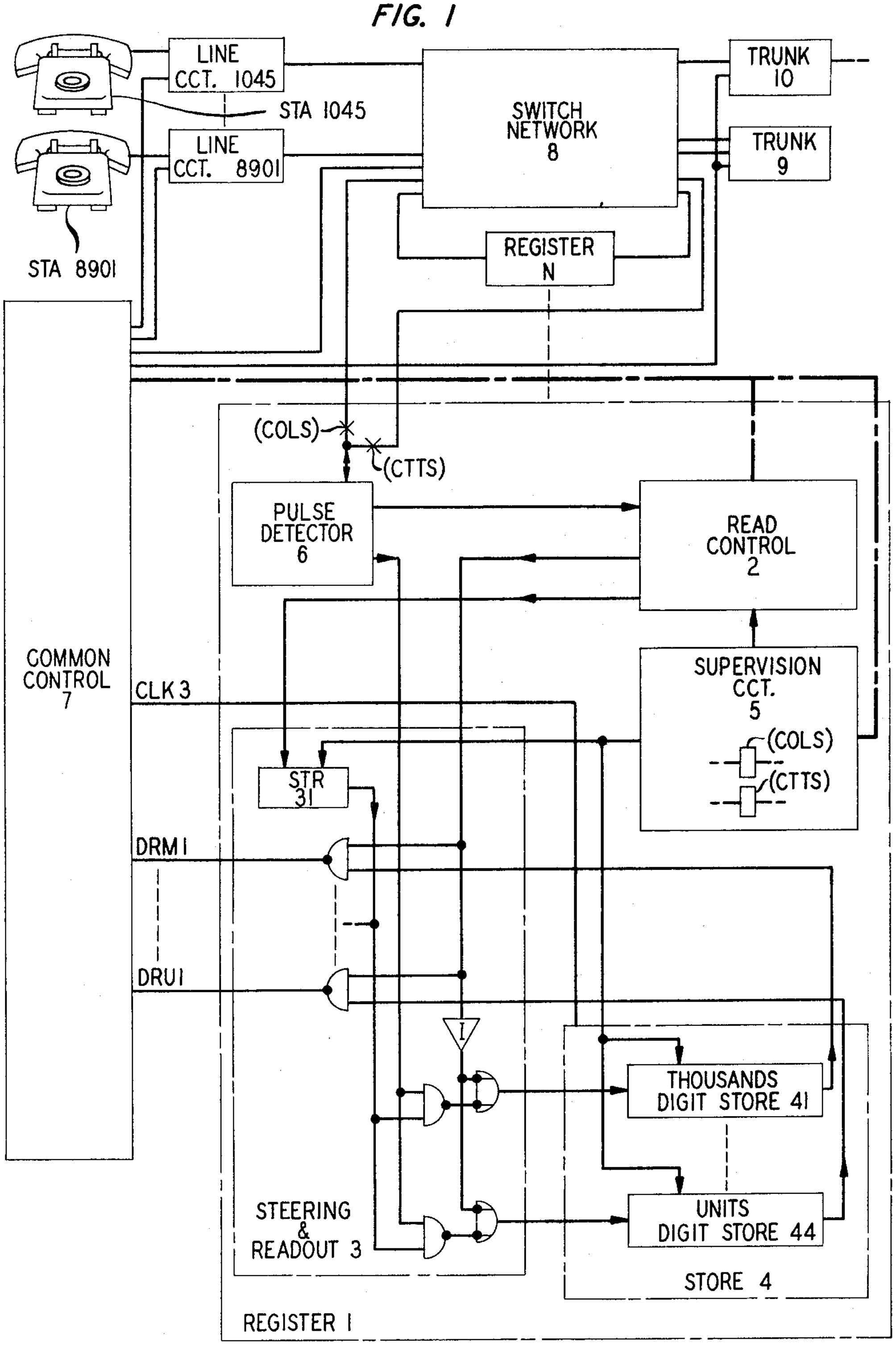
FIG. 1 illustrates a common control switching system embodying the register readout arrangement of the instant invention.

Referring now to FIG. 1 of the drawing it is intended that digital register 1 shown thereon be associated with a conventional telephone switching system of the type set forth in the aforementioned patent by H. H. Abbott et al. To facilitate the description of the present embodiment the designations of certain leads and apparatus shown in FIGS. 2 and 3 have been enclosed in parentheses to indicate that such leads and apparatus are shown and described in detail in the aforecited Abbott patent. The present invention is not limited to use with a telephone switching system of this type but may be advantageously utilized with other types of switching systems.

As denoted in the drawing of FIG. 1 a plurality of telephone stations, represented by stations 1045 and 8901, are each connected to a correspondingly numbered line circuit. Each line circuit is connected to common control 7 and to the left side of switch network 8. Trunks 9 and 10, used to establish connections between telephone stations 1045 and 8901, and between remote switching systems and telephone stations of the switching system of FIG. 1, are connected to the right side of switch network 8. A plurality of registers, 1 through *n*, that function to count and store successively received number digits, and to read out the stored digits to common control 7, are connected to both the left and right sides of switch network 8. Throughout the remainder of this description, the left side of switch network 8 is referred to as the "line side" while the right side is referred to as the "trunk side." Common control 7 regulates and coordinates the operation of every circuit of the switching system during the serving of calls, and, accordingly, is connected to the line circuits, the switch network, the registers, and various trunk circuits.

A call is initiated in the conventional manner when a calling party lifts the handset at his telephone station, for example, telephone station 1045, preparatory to dialing the number digits of the called telephone station. As described in detail by the aforesaid patent of H. H. Abbott et al. an off-hook telephone station, such as station 1045, is connected through line circuit 1045 from the line side of switch network 8 to the trunk side appearance of an idle digital register such as register 1. Common control 7 directs supervision circuit 5 to enable pulse detector 6 to return dial tone to off-hook station 1045 and to set steering counter STR 31 to an initial steering counter state in order that the first number digit may be directed to thousands digit store 41.

Upon receipt of dial tone the calling party located at telephone station 1045 proceeds in the normal manner to dial each digit of the called telephone station number. The dialing of a number digit consists of one to ten equally spaced momentary loop openings generated by the calling line. A called telephone station number comprises a plurality of number digits the total number of which depend upon the type of switching system serving the calling station and the type of call being originated by the calling party. If, for example, the calling party located at telephone station 1045 requires attendant assistance he would dial the number digit "0" which would be represented by 10 equally spaced momentary openings of the calling line. Should the calling party desire to originate a call to another telephone station served by the same switching system, such as telephone station 8901, the calling party is required to sequentially dial the number digits "8", "9", "0", and "1". The first dialed number digit is referred to as the thousands digit, and for the number digit " 8" is represented as eight momentary openings of the calling line. The second number digit is designated the hundreds digit and for the dialed number digit "9" comprises nine momentary openings of the calling line. Similarly, the third and fourth number digits are referred to as the tens and units digits, respectively, and for the digits "0" and "1" are generated by opening the calling line 10 times for digit "0" and one time for digit "1". Between each of the dialed number digits is an interdigital timing interval during which the calling line remains closed.

Pulse detector 6 recognizes the first momentary opening of calling line 1045 and notifies read control 2 that the first digit is being dialed. In addition, pulse detector 6 generates a pulse for each opening of the calling line and serially transmits each pulse of the first digit through logic circuitry enabled by steering counter STR 31 to advance thousands digit store 41 of store 4 from an initial counting state to a stored digit counting state. Following detection of the last momentary line opening of the dialed first digit, pulse detector 6 signals read control 2 to transmit a readout request to common control 7. Common control 7 initiates a read digit register mode by connecting a high speed pulse train to read control 2 to advance thousands digit store 41 from the stored digit counting state through the initial counting state back to the stored digit counting state. When thousands digit store 41 advances through the initial counting state the remaining pulses of the high speed pulse train that correspond to the sum of the pulses previously recorded in thousands digit store 41 are serially read out over lead DRM1 into common control 7. If common control 7 determines that the first dialed number digit is a valid single digit code, for example, "0" or "9", the call is completed accordingly and register 1 is released.

If additional number digits are expected, read control 2 sets the STR 31 counter to the next state in order to direct the pulses representing the second dialed digit into the hundred digit store of store 4. At the end of the second dialed number digit read control 2 again requests common control 7 to initiate the read digit register mode. Common control 7 responds by signaling read control 2 to serially read out pulses identifying the thousands and hundreds digits recorded in store 4 over digital leads extending to common control 7. In a similar manner, register 1 detects and records the tens and units number digits generated by the calling line in the proper digital stores of store 4. During the time intervals immediately preceding and succeeding receipt of the dialed units digit, common control 7 enters the read digit register mode to read out the thousands, hundreds and tens number digits and the thousands, hundreds, tens and units number digits, respectively, in a serial pulse format over digital leads DRM1 through DRU1.

Although the present embodiment assumes a call originated by a calling party located at telephone station 1045 it is also to be recognized that a call may be originated and completed in a similar manner by a calling party connected to trunk 10.

DETAILED DESCRIPTION

1. General

Referring now to FIG. 3, it is intended that each thousands, hundreds, tens, and units digit store 41, 42, 43, and 44, respectively, be comprised of a cascade of four binary flip-flop memory elements arranged to form a binary ripple counter having sixteen possible counting states. The flip-flop elements of each digit store are connected in the well known manner so that an output from a preceding flip-flop will trigger a succeeding flip-flop to the reverse state during every other trigger input to the preceding flip-flop element.

In the initial state it is assumed that every counter flip-flop element is set to the "0" state to create an initial digit store counter state 0000. The first pulse applied to the trigger input T of a digit store counter set in the initial counter state sets the first flip-flop element to the "1" state to provide a subsequent stored digit counter state 1000. The second externally applied pulse to a digit store counter resets the first flip-flop element to the "0" state, which in turn, triggers the second flip-flop element to the "1" state to create a counter state of 0100. Subsequent pulses continue to change the output of the first flip-flop element on every positive going transition occurring at trigger input T. In addition, the outputs of the second flip-flop element change on every other positive transition at the trigger input T, the outputs of the third flip-flop element change on every fourth positive transition and the outputs of the fourth flip-flop element on every eighth positive transition.

On the fifteenth pulse, every digit store counter flip-flop element is set to the "1" state thereby establishing a counter state 1111. The next input pulse, the sixteenth input pulse, resets all digit store counter flip-flop elements to the "0" state to advance the counter to the initial counter state of 0000. Thus, each digit store counter counts pulses appearing at input T and stores the result in a binary code format in one of the 16 counting states corresponding to the number of pulses received. Similarly, the application of a number of pulses equal to the number of counting states advances a digit store counter from the initial counting state through all counting states back to the initial counting state. If a digit store counter is initially set to a stored digit counting state the application of the fixed number of pulses advances the counter through all counting states back to the initial stored digit counting state.

2. Register Circuit

A subscriber located at telephone station 1045, FIG. 1, and desiring to place a call to another telephone station, such as station 8901, initiates a calling sequence by operating the switchhook of telephone station 1045. As set forth in detail in the aforementioned patent by H. H. Abbott et al., common control 7 detects the off-hook state of telephone station 1045 and selects an idle digital register. Assuming, for example, that register 1 has been selected, common control 7 enables supervision circuit 5 to operate relay (CTTS) to connect calling telephone station 1045 through line circuit 1045 and switch network 8 to pulse detector (6).

Referring now to FIGS. 2 and 3, arranged with respect to each other as shown on FIG. 4, it is intended that steering counter STR 31 of the present embodiment be comprised of two flip-flop elements identical to those utilized by the digit stores of store 4 and connected so that successive inputs applied to input T advance the counter through four successive counting states. The selection of register 1 by common control 7 enables supervision circuit (5) to place a momentary high signal on lead (RST), in the manner described in detail in the previously referred to patent by H. H. Abbott et al. to set the flip-flop element of steering counter STR 31 to the initial steering counter state 11. Similarly, the high signal on lead (RST) is applied to store 4 to reset the flip-flop elements of thousands digit store 41, hundreds digit store 42, tens digit store 43, and units digit store 44 to the initial store counter state 0000. The high signal on lead (RST) is inverted into a low signal and applied to read control 2 to enable OR gate CRR to reset flip-flop RR to the "0" state. With flip-flop RR reset to the "0" state, a high signal is applied to an input of AND gate LDI and a low signal is applied over lead FOR 1 to inputs of steering counter STR 31 and AND gate RF. Gate RF is inhibited and the resulting high output signal, in combination with the high signals on the "1" output leads of steering counter STR 31 partially prepares AND gate STM for subsequent operation.

3. Dialing First Digit

Upon receipt of dial tone the calling subscriber located at telephone station 1045 proceeds in the well-known manner to dial the first number digit of called telephone number 8901. Pulse detector (6) detects the first pulse of the dialed number digit "8" and places a high signal on the (PTB) lead to one of the inputs of AND gate TCRR of read control 2. In addition, pulse detector (6) places a low signAl on lead (LD) to enable AND gate LDI during the time interval a dial pulse is received from the calling telephone station.

Pulses appearing on the output of AND gate LDI are inverted and applied, via lead LD1 to an input of AND gate STM. The operation of AND gate STM in response to the dial pulse signals received over lead LD1 enables OR gate TM to pulse input T of thousands digit store 41 every time a first digit dial pulse is generated by the calling subscriber. Thus, for the first dialed digit of telephone number 8901, eight pulses are applied to input T of thousands digit store 41 to advance the flip-flop elements from the initial store counter state 0000 through eight counting states to stored digit counter state 0001.

4. Read Register Mode

Following the initial seizure of register 1 by common control 7 the RR flip-flop was reset to the "0" state to place a low signal on lead FOR1. With a low signal applied to lead FOR1 the RRM flip-flops of the digit stores 41, 42, 43, and 44 are locked in the "0" state and AND gate SRR1 of read control 2 is inhibited so that a high signal may be applied to an input of AND gate TCRR. During the interval of time that the train of pulses of the first dialed digit is being received, pulse detector (6) applies a high signal to lead (PTB). With high signals being applied to both inputs AND gate TCRR is enabled to place a low signal on the inputs of OR gates CRR and TRR. The resulting high signal output of OR gate CRR continues to lock flip-flop RR in the "0" state.

At the end of the last pulse of the dialed pulse train, pulse detector (6) places a low signal on lead (PTB) to inhibit AND gate TCRR. The subsequent high signal output of AND gate TCRR inhibits OR gate CRR to remove the locking signal on the reset lead of flip-flop RR and inhibits OR gate TRR to place a high signal on the T input to toggle flip-flop RR to the "1" state. When flip-flop RR is set to the "1" state the high signal appearing on lead FOR1 removes the locking signal from flip-flops RRM and is inverted into a low signal on lead (FOR) and transmitted to common control 7 as a register read request indication.

The high signal on lead FOR1 partially prepares AND gate SRR1 for subsequent operation and, when applied to input T of steering counter STR 31, advances the counter to steering counter state 00. In a typical switching system, such as the one disclosed in the previously recited Abbott patent, common control 7 recognizes the low signal appearing on the (FOR) lead as a register read request and enters the read register mode by placing high signals on the (RDA1) leads to all registers of the system. Common control 7 obtains the identity of a register requesting readout by placing a low signal on the (XIC) lead of each register in turn.

The placing of a low signal on the (XIC) lead of a register, for example register 1, requesting readout, enables AND gate SRR1 of read control 2 to inhibit AND gate TCRR during the register readout sequence and to place a low signal on lead (RT) to inform common control 7 that the register requesting readout has been found.

The low signal appearing on lead (RT) is utilized by common control 7 to initiate the readout of register 1 and as a start signal for pulse source 71. Pulse source 71 may be any type of pulse generator, well known in the art, capable of generating a train of 16 high speed pulses. For the instant embodiment it is assumed that the generated pulses have a time duration T of approximately 5 microseconds and occur at intervals of 20 microseconds. However, it is to be recognized that the present invention is not limited to use with a pulse generator having a fixed pulse duration and repetition rate but may be advantageously utilized with pulse generators having a wide range of pulse duration and repetition rates.

Pulse source 71, enabled by the low signal appearing on lead (RT), applies the fixed number pulse train of 16 high pulses over lead RRP to an input of AND gate SP1. Since the inverted low signal output of AND gate SRR1 maintains the remaining input of AND gate SP1 high, the 16 pulses are repeated by AND gate SP1, inverted, and applied, via lead RRP1, to inputs of readout gates DRM, DRH, DRT, and DRU. In addition, each of the 16 pulses appearing on lead RRP1 are inverted and applied to OR gates TM, TH, TT, and TO to pulse the thousands, hundreds, tens, and units digit stores of store 4. Pulse source 71 of common control 7 is connected via lead RRP to delay network D72 in order that every high pulse generated by pulse source 71 may be delayed by an interval of time so that pulses appearing on lead CLK3 occur after the end of a similar pulse appearing on lead RRP. These delayed pulses are applied over lead CLK3 to register 1 to an input of AND gates ZOM of each digit store comprising store 4.

Assuming that the first dialed number digit "8" has been previously recorded in thousands digit store 41, the digit counter is set to the stored digit counter state 0001. The first of the 16 high speed pulses appearing at input T advances the counter from the stored digit counter state 0001 to counter state 1001. At the end of the seventh input pulse the counter of thousands digit store 41 has advanced seven counting states to counter state 1111. The following pulse, or eighth pulse of the 16 pulse train, advances thousands digit store 41 to the initial counting state 0000 to place high signals on four of the inputs to AND gate ZOM. When the subsequent delay pulse appears on lead CLK3, AND gate ZOM is enabled to generate a low signal to set flip-flop RRM to the "1" state in order that a high signal may be transmitted over lead RRM to an input of readout AND gate DRM. Appearance of the ninth pulse on lead RRP1 enables both AND gate DRM to transmit a pulse signal via lead DRM1 to common control 7 and OR gate TM to advance the counter of thousands digit store 41 to counter state 1000. Similarly, the remaining seven pulses of the original 16 high speed pulse train enable AND gate DRM to transmit seven additional serial pulses to common control 7 and thousands digit store 41 to advance through seven counting states to stored digit counter state 0001. Since thousands digit store 41 has been advanced from stored digit counter state 0001 through 16 counting states to digit counter state 0001 there has been, in effect, a nondestructive readout of eight serial pulses, representing the first dialed number digit recorded in thousands digit store 41, from register 1 into common control 7.

5. Second Dialed Digit

Upon receipt of pulses representing the first dialed number digit, common control 7, in the well-known manner, is enabled to complete the call or to inform register 1 that more dialed digits are required. In the event the first dialed digit number is a valid single digit code, common control 7 releases register 1 and completes the call accordingly. Upon determining that additional digits are required common control 7 removes the low and high signals from leads (XIC) and (RDA1), respectively, to inhibit AND gate SRR1. The resulting high signal output of AND gate SRR1 is applied to inputs of AND gate TCRR and OR gate TRR. Since lead (PTB) remains low during the interdigital timing interval, AND gate TCRR is inhibited and places a high signal on inputs of OR gates TRR and CRR. With both inputs high, OR gate TRR places a low signal to an inverter in order to toggle flip-flop RR to the "0" state to remove the low request register readout signal from lead (FOR) and to partially enable AND gate LDI.

When steering counter STR31 is set to steering counter state 00 low signals are applied, via leads connected to the "1" outputs of the steering counter flip-flop elements, to inputs of AND gates STM, STT, and STU to inhibit the operation of these gates during the dialing of the hundreds digit. In addition, steering counter STR31 places high signals on leads connected to the "0" outputs of the steering counter flip-flop elements to partially prepare AND gate STH for subsequent operation.

Pulse detector (6) detects the train of dialed pulses of the hundreds digit and places a high signal on lead (PTB) to the input of AND gate TCRR so that OR gate CRR is enabled to lock flip-flop RR in the "0" state. In the aforementioned manner, pulse detector (6) places pulses representing the dialed hundreds digit onto lead (LD) to enable AND gate LDI to operate AND gate STH and OR gate TH connected to input T of hundreds digit store 42. Assuming that the calling subscriber has dialed the hundreds number digit "9", nine pulses are applied to input T of hundreds digit store 42 to advance the counter from the initial counting state 0000 to the stored digit counting state 1001.

Following the ninth pulse of the hundreds digit pulse train, pulse detector (6) removes the high signal from lead (PTB) to inhibit AND gate TCRR in order that flip-flop RR may be set to initiate a read register request to common control 7. The setting of flip-flop RR also causes steering counter STR31 to advance from steering counter state 00 to steering counter state 10. The resulting high signals appearing on the 1 output of steering counter flip-flop FF1 and on the 0 output of flip-flop FF2 partially prepares AND gate STT for subsequent operation. The low signal on the 0 output of steering counter flip-flop FF1 enables OR gate HND to place a high signal on an input of AND gate DRH.

As earlier set forth in detail, common control 7 scans for and seizes register 1 by applying high and low signals to leads (RDA1) and (XIC) respectively. When common control receives a low signal on lead (RT), pulse generator 71 applies a high speed train of 16 pulses on lead RRP to read control 2 and a delayed train of pulses over lead CLK3 to store 4 of register 1. The high speed pulse train appearing on lead RRP enables AND gate SP1 to apply 16 serial pulses, via lead RRP1, to the inputs of read output gates DRM and DRH, and in addition, to the inputs of all digit stores of store 4.

The application of the 16 pulse train to the T input of thousands digit store 41 advances the counter from the stored digit counter state 0001. Similarly, the 16 pulse train enables the hundreds digit store 42 counter to advance from stored digit state 1001, representing stored number digit "9", through 16 counting states to stored digit counting state 1001. A pulse of the delayed 16 pulse train appears on inputs CLK3 of thousands digit store 41 and hundreds digit store 42 after each store counter has advanced through the initial counting state 0000 to enable AND gates ZOM to set the RRM flip-flops to the "1" state. The setting of these flip-flops places a high signal on the RRM and RRH leads to readout gates DRM and DRH, respectively. Following the setting of the thousands and hundreds digit store RRM flip-flops, the remaining pulses of the 16 pulse train appearing on lead RRP1 to the inputs of readout gates DRM and DRH are transmitted over leads DRM1 and DRH1 to common control 7. Thus, during the interdigital timing interval following the dialing of the hundreds digit both the stored thousands digit "8" and the hundreds digit "9" are transmitted in an eight and nine serial pulse format from register 1 to common control 7.

6. Subsequent Dialed Digits

After receipt of the thousands and hundreds number digits, common control 7 removes the high and low signals from leads (RDA1) and (XIC) respectively to initiate the sequence to toggle flip-flop RR to the "0" state. In the same manner as described for the previously dialed thousands and hundreds number digits, pulse detector (6) places a high signal on lead (PTB) to lock flip-flop RR in the "0" state and repeats the pulses of the dialed tens number digit "0" to advance tens digit store 43 from the initial counter state 0000 through ten counting states to stored digit counting state 0101.

During the interdigital timing interval following dialing of the tens number digit, pulse detector (6) removes the high signal from lead (PTB) to set steering counter STR31 to steering counter state 01 and to signal common control 7 to read register 1. The high signals appearing on both the "0" output of steering counter flip-flop FF1 and the "1" output of flip-flop FF2 partially prepare AND gates DRT and STU for subsequent operation. The low signal on the "0" output of flip-flop FF2 enables OR gate HND to place a high signal on one of the inputs to AND gate DRH.

Common control 7 again responds to the read request from register 1 by applying the high speed 16 pulse train to lead RRP to inputs of AND gates DRM, DRH, and DRT. In addition, the 16 pulse train on lead RRP advances the thousands, hundreds, and tens digit stores 41, 42, and 43 from their stored digit counter states 0001, 1001, and 0101 through 16 counting states. The advancement of each thousands, hundreds, and tens digit store through the initial counter state 0000 partially prepares AND gates ZOM so that the following delayed pulses appearing on leads CLK3 enable AND gates ZOM to set flip-flops RRM. Setting flip-flops RRM to the "1" state places high signals on leads RRM, RRH, and RRT to corresponding inputs of AND gates DRM, DRH, and DRT in order that the remaining pulses of the 16 pulse train appearing on lead RRP1 may be gated by AND gates DRM, DRH, and DRT onto leads DRM1, DRH1, and DRT1, respectively. Thus, eight pulses are transmitted over lead DRM1 to common control 7. Similarly, the last 9 pulses appearing at AND gate DRH and the last 10 pulses appearing at AND gate DRT are transmitted over leads DRH1 and DRT1 to common control 7.

The pulses representing the dialed units number digit are recorded in units digit store 44. Assuming that the calling party located at telephone station 1045 has dialed telephone number 8901, the single dialed pulse representing dialed units number digit "1" advances the counter of units digit store 44 to stored digit counting state 1000. Pulse detector (6) recognizes the end of dialing and places a low signal on lead (PTB) to initiate the register read sequence and to set steering counter STR31 to steering counter state 11. High signals on the "1" outputs of steering counter flip-flops FF1 and FF2, in combination with the high signal present on lead FOR1, enable AND gate RF to inhibit AND gate STM to prevent any digits subsequently dialed by the calling party from being recorded by thousands digit store 41. In addition, the setting of flips-flops FF1 and FF2 to steering counter state 11 partially prepares readout gates DRH, DRT, and DRU for subsequent operation and inhibits AND gates STH, STT, and STU. As set forth above in detail, common control 7 applies a 16 high speed pulse train to register 1 to read out the number digits previously recorded in thousands, hundreds, tens, and units digit stores 41, 42, 43, and 44. The 8, 9, 10, and 1 serial pulse trains received over leads DRM1, DRH1, DRT1, and DRU1, respectively, effect the transfer of the dialed telephone number 8901 to common control 7 in order that common control 7 may direct the switching system to establish a connection from calling telephone station 1045 to called telephone station 8901.

7. Dialing in the Read Register Mode

It is possible that a calling party may dial a number digit prior to the time that common control 7 becomes available to read the register or in the interval of time that the register is reading the previously stored dialed number digits into common control 7. During the dialing interval both inputs of AND gate TCRR are provided with high signals to ensure that flip-flop RR is locked in the "0" state. At the end of the dialing interval a low signal is placed on lead (PTB) to both inhibit AND gate TCRR and remove the locking signal and to inhibit OR gate TRR to toggle flip-flop RR to the "1" state. With flip-flop RR set a low read register signal is sent over lead (FOR) to common control 7. Should the calling party start to dial before common control 7 becomes available to service register 1 the resulting high signal on lead (PTB) enables AND gate TCRR to reset the RR flip-flop to the "0" state. The reset of the RR flip-flop removes the read register signal before it has been honored and advances steering counter STR31 to the next steering counter state. Common control 7, in honoring the subsequent read register request, is enabled to read all priorly stored dialed digits from the register.

When common control 7 answers the read register signal on lead (FOR) it enables AND gate SRR1, via leads (XIC) and (RDA1), to place a low signal on an input of AND gate TCRR. The low "0" output of the RR flip-flop inhibits AND gate LDI to prevent the first dialed pulse from being applied to AND gates STM, STH, STT, and STU. Thus, if the calling party starts to dial during the short readout interval the read-in function is delayed until the short readout function is completed.

Finally, in those cases wherein an incomplete number is dialed by the calling party, supervision circuit (5), in the manner set forth in detail in the aforementioned patent by H. H. Abbott et al., places a high signal on lead (TO) to set flip-flop RR to initiate a register readout sequence so that common control 7 may take the appropriate action.

SUMMARY

It is obvious from the foregoing that the facility, economy, and efficiency of switching systems may be substantially enhanced by the provision of a register capable of transferring previously stored number digits over single digital leads during the time interval existing between successively dialed digits. It is further obvious from the foregoing that the aforesaid register's unique feature of serially gating a number of high speed pulses corresponding to the previously stored number digits onto single digital leads during the interdigital time interval obviates the need to transfer the contents of each counter's individual storage elements over parallel leads to a common controller.

While the equipment of our invention has been described in a common controlled switching system wherein station generated number digits are recorded and subsequently transmitted in a serial format over digital leads to a common controller, it is to be understood that such an embodiment is intended to be illustrative of the principles of our invention and that numerous other arrangements may be devised by those skilled in the art without departing from the spirit and scope of the invention.

For example, the present system could be used to convert binary coded parallel information into decimal coded serial information. The binary coded information could be received over parallel leads connected to each counter's storage elements and utilized to set the counter to a binary counting state corresponding to the received information. The application of a pulse train would advance the counter to control the disclosed logic circuitry to generate a serial pulse train having a number of pulses corresponding to the decimal equivalent of the received binary coded parallel information.

What is claimed is:

1. In a system having control means responsive to digit pulse trains representing digits, the combination comprising means having a fixed number of counting states and responsive to said digit pulse trains for counting pulses of said digit pulse trains by assuming ones of said counting states representing said digits, means controlled by said control means for applying a high speed pulse train having a number of pulses equal to the number of said counting states to said counting means to cycle said counting means from said assumed digit counting states through said fixed number of counting states, and means enabled when said counting means are advanced through a defined one of said counting states for serially gating a number of said high speed pulses corresponding to said assumed digit counting states to said control means.

2. In a switching system having control means responsive to digit pulse trains, the combination for registering said digit pulse trains and for successively transferring each such registered pulse train to said control means during an interdigital interval over a single lead for each such pulse train comprising means having a fixed number of counting states and responsive to said digit pulse trains for counting pulses of said digit pulse trains by assuming one of said counting states, means controlled by said control means for applying a high speed pulse train having a number of pulses equal to the number of said counting states to said counting means to advance said counting means from said assumed counting state through said fixed number of counting states during an interdigital time interval, and means enabled when said counting means are advanced through a defined one of said counting states for serially gating a number of said high speed pulses corresponding to said assumed counting state to said control means.

3. In a switching system the invention defined in claim 2 wherein said counting means comprises means having said fixed number of counting states and enabled by said pulses of said digit pulse trains for recording a sum of said pulses in said assumed ones of said counting states, and means for selectively steering said digit pulse trains to predetermined ones of said recording means.

4. In a switching system the invention defined in claim 3 wherein said recording means comprises accumulating means including a chain of $n$ serially connected bistable elements, wherein $n$ is an integer, for registering the binary sum of said pulses in predetermined ones of $2^n$ counting states, and control gate means connected to said accumulating means and enabled by said steering means to advance said accumulating means one counting state for each sequentially received pulse.

5. In a switching system the invention defined in claim 4 wherein said steering means comprises sequentially controlled bistable elements having a fixed number of counter states for selectively enabling said control gate means.

6. In a switching system the invention defined in claim 5 wherein said applying means comprises readout means enabled by the termination of each of said digit pulse trains for advancing said sequentially controlled bistable means one said counter state and for signaling said control means to read the recorded pulse sum of said accumulating means.

7. In a switching system the invention defined in claim 6 wherein said applying means further comprises pulse repeating means enabled by said signaled control means for addressing a fixed number of high speed pulses to said control gate means to advance said accumulating means through $2^n$ counting states.

8. In a switching system the invention defined in claim 7 wherein said gating means comprises means enabled by said serially connected bistable elements advancing through said defined counting states for generating a control signal.

9. In a switching system the invention defined in claim 8 wherein said gating means further comprises means controlled by said steering means and said generating means for transmitting remaining ones of said high speed pulses to said control means.

10. In a telephone switching system wherein telephone stations and trunks may be interconnected through a switch network enabled by a common controller responsive to digit pulse trains received from said stations and said trunks, the combination comprising a plurality of digit counters each having a fixed number of digit counting states for counting dial pulses of said digit pulse trains by assuming one of said digit counting states, control gate means connected to each of said digit counters and enabled by said dial pulses for advancing said digit counters from an initial one of said digit counting states to said assumed digit counting state, steering counter means having a fixed number of counter states for selectively directing said digit pulse trains to predetermined ones of said control gate means, readout means responsive to a termination of each of said digit pulse trains for applying a signal to both said steering counter to advance said steering counter to a next one of said counter states and to said common controller, pulse repeating means enabled by said signaled common controller for applying a high speed pulse train having a predetermined number of pulses to said control gate means to advance said digit counters from said assumed digit counting states through said fixed number of digit counting states, binary logic means enabled by said common controller for detecting the advance of said digit counters through said initial counting states, and means controlled by said steering counter in combination with said enabled binary logic means for gating a number of said high speed pulses corresponding to said assumed digit counting states into said common controller.

11. In a pulse register circuit wherein incoming pulses of digital pulse trains may first be counted and accumulated and then read out onto digital leads by the application of a pulsing train having a fixed number of pulses, the combination comprising a plurality of digit counters each having a chain of *n* serially connected bistable memory elements where *n* is an integer for counting said incoming pulses by assuming one of $2^n$ binary counting states, a plurality of control gates each connected to one of said digit counters and responsive to said digital pulse trains for advancing said counters from an initial one of said binary counting states to said assumed binary counting state, a steering counter having serially connected bistable memory elements connected to said control gates for selectively directing said digital pulse trains to predetermined ones of said control gates in response to counter states of said steering counter memory elements, a readout means responsive to a termination of each of said digital pulse trains for applying a signal to advance said steering counter from one counter state to another, a pulse repeating means enabled by said signal of said readout means for applying said pulsing train to said plurality of control gates to concurrently advance said digit counters through said $2^n$ binary counting states, a binary logic means individual to each of said digit counters and enabled by said digit counter bistable memory elements for detecting the advance of each said digit counter from said assumed binary counting state through a zero counting state, and means controlled by said steering counter in combination with said binary logic means for serially reading out onto said digital leads decimal numbers of pulses of said pulsing train corresponding to the assumed binary counting states of said digital counters.

* * * * *